Oct. 20, 1931.  C. C. HOLLEY  1,828,603
TROLLEY MEAT HOOK
Filed Sept. 18, 1930
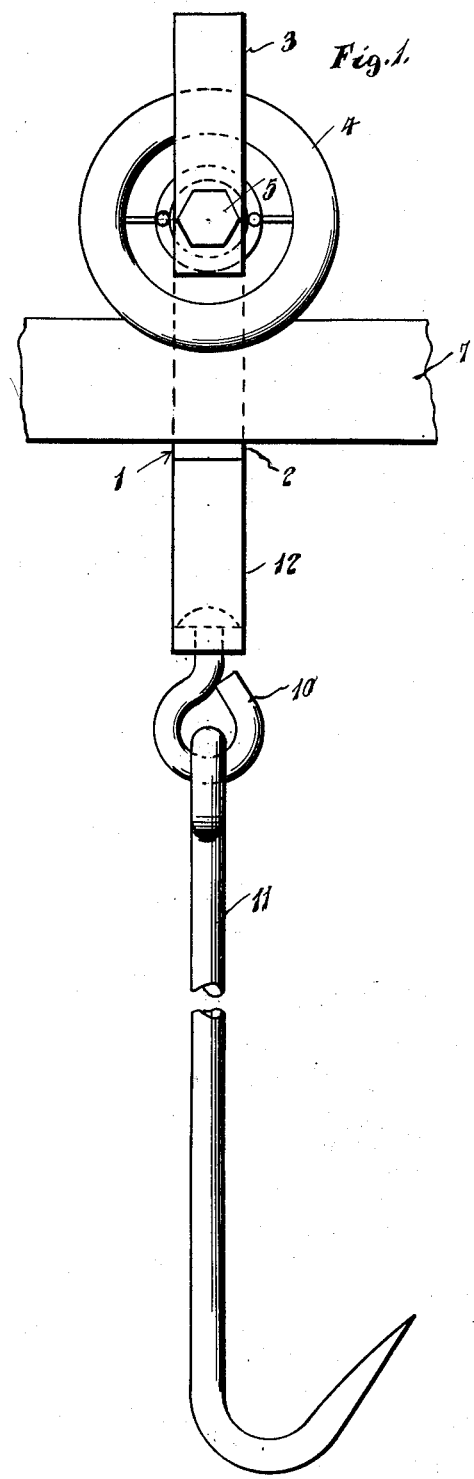
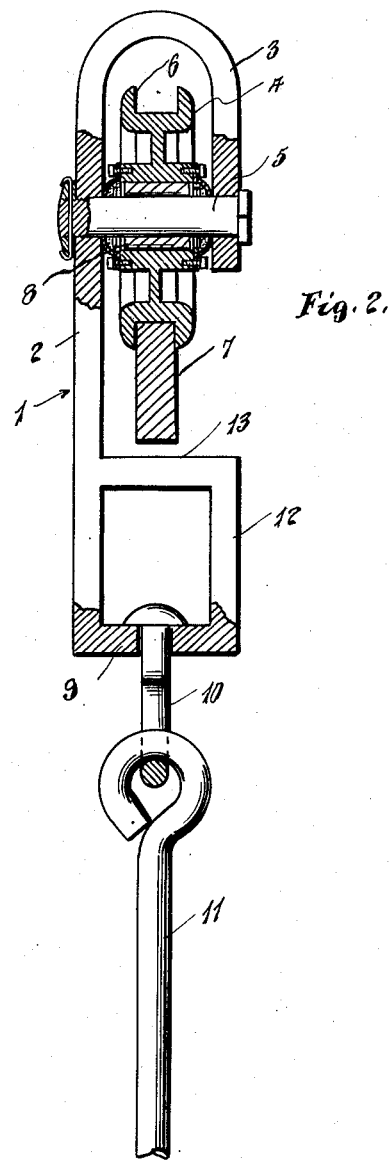
Inventor
C. C Holley.
By L. F. Randolph, Jr.
Attorney Patented Oct. 20, 1931

1,828,603

UNITED STATES PATENT OFFICE

CECIL C. HOLLEY, OF CHARLESTON, WEST VIRGINIA

TROLLEY MEAT HOOK

Application filed September 18, 1930. Serial No. 482,901.

The invention relates to devices for holding and carrying large pieces of meat in cold storage ware-houses, and the like, and has for its object the improvement of a supporting member whereby the roller that travels on the overhead rail will be held from displacement relatively to the rail, and undue swinging of the meat suspended on the hooks will be obviated, the invention also contemplating providing a hook that is reasonable in cost of manufacture and that is simple in construction, and easy to operate.

The invention will be described in detail hereinafter and will be found illustrated in the accompanying drawings in which Figure 1 is a side view in elevation of the improved trolley meat hook, and Figure 2 is an end view showing parts broken away and in section.

In the drawings similar reference characters are used to designate corresponding parts in both of the views.

The supporting member of the trolley meat hook, designated 1, is preferably made of a bar of steel 2, having one of its ends returned on itself and spaced to provide an inverted U-shaped hanger member 3 to receive a wheel 4 journaled on a shaft 5 supported in said hanger member 3, the wheel being provided with a circumferential groove 6 to receive an overhead rail 7. The bearing for the wheel 4 on the shaft 5 is an anti-friction bearing as shown at 8 to provide for ease in rotation of the wheel in movement on the rail 7.

The lower end of the bar 2 is provided with an eye portion including a lateral offset portion 9 in which is swively mounted a ring 10 to which is secured the suspending hook 11. At the outer end of the lateral offset portion 9 the eye portion is continued by an angular extension 12 having its extremity 13 extended inwardly into abutting relation with the bar 2 and spaced slightly below the rail 7 to provide means to prevent undue swinging of the device in carrying a load, and also to prevent the wheel 4 from leaving the track while in operation.

What is claimed is:—

A trolley meat hook, comprising a bar having one of its ends formed into a U-shaped portion, a bearing axle supported by said U-shaped portion, a wheel journaled on said axle and provided with a circumferentially grooved tread adapted to travel on an overhead track, the other end of said bar having an eye portion consisting of a laterally offset portion adapted to support a meat hook, an upturned angular extension on the extremity of said offset portion having a side extended towards the bar and adapted to be positioned under the track to prevent the wheel leaving the track.

In testimony whereof, I affix my signature.

CECIL C. HOLLEY.